June 20, 1939. H. H. HASCHE 2,162,718
LEAF SPRING LUBRICATOR
Filed Feb. 4, 1938
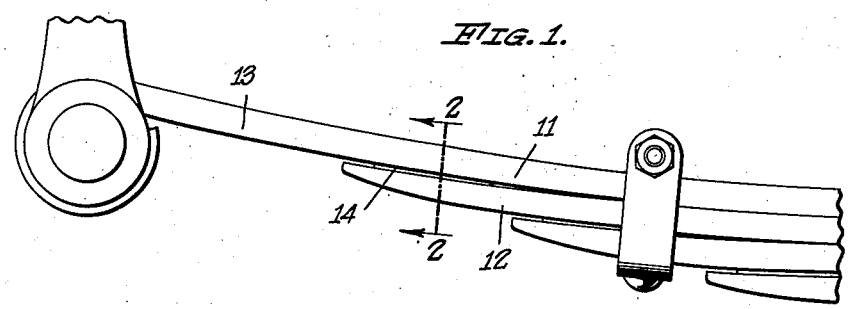
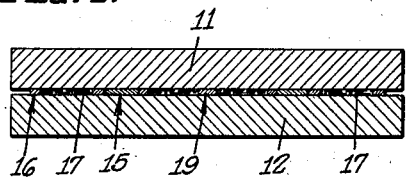
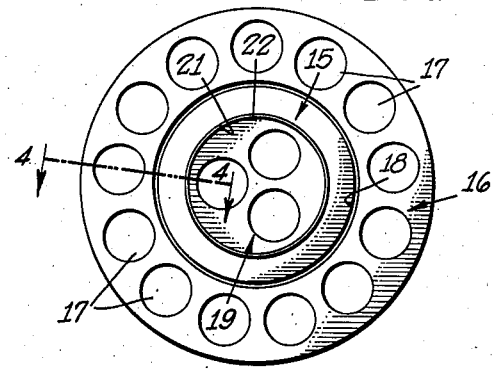
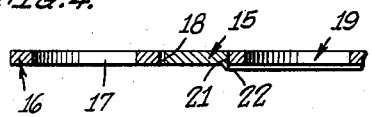
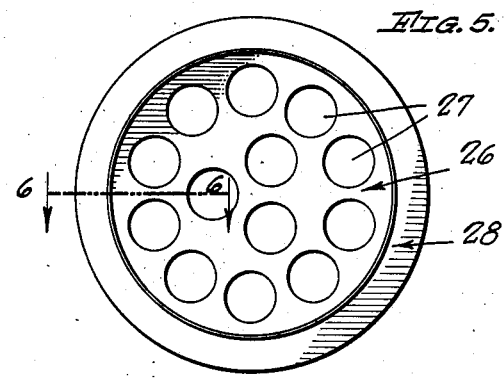
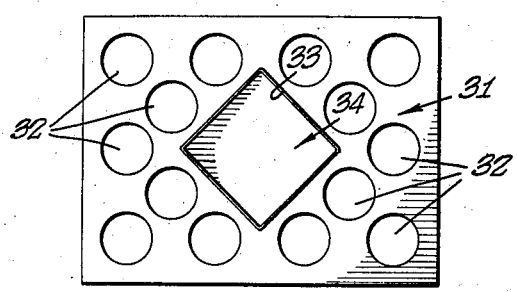
INVENTOR
HERBERT H. HASCHE
ATTORNEY Patented June 20, 1939

2,162,718

UNITED STATES PATENT OFFICE 2,162,718

LEAF SPRING LUBRICATOR

Herbert H. Hasche, Los Angeles, Calif.

Application February 4, 1938, Serial No. 188,729

7 Claims. (Cl. 267—50)

This invention relates to lubricating devices, and more particularly to leaf spring lubricators of the type forming the subject matter of United States Letters Patent No. 2,071,854, issued to Ross on February 23, 1937.

An object of the present invention is to provide a leaf spring lubricator of the general character indicated, the efficiency, dependability and serviceability of which are substantially increased by the incorporation therewith of the details of improved construction described hereinbelow.

A more specific object of my invention is to provide in a lubricator of which the principal characteristic is its flat, sheet-like form, adapting it for insertion between the two adjacent leaves of a leaf spring, means for anchoring the plate so as to retain it in operative position between the leaves and yet to permit a certain degree of movement of the lubricator with respect to both of the associated leaves.

A further object is to provide a lubricator as described, wherein unrestricted flow of the lubricant to both of the associated leaves is permitted, in sharp contrast to prior lubricators of this type, wherein the anchoring means effectually prevent flow of lubricant to one of the leaves.

A still further object of the present invention is to provide a lubricator as described wherein the lubricating plate is permitted to shift gradually and continuously as the spring is operated, so as to distribute wear evenly and also to insure equal distribution of the lubricant throughout the contiguous areas of the associated spring leaves.

Another important object is to provide a lubricator, the construction of which is such that I can secure the foregoing and other advantages by a relatively simple and inexpensive apparatus easy to manufacture, assemble and install and certain to yield the most efficient results in use.

The invention possesses other objects and advantageous features some of which, with the foregoing, will be set forth in the following description of the preferred forms of my invention which are illustrated in the drawing accompanying and forming a part of the specification. It is to be understood that I do not limit myself to the showing made by the said drawing and description, as I may adopt variations of the preferred forms within the scope of my invention as set forth in the claims.

Referring to the drawing:

Fig. 1 is a view in side elevation of a conventional type of leaf spring ordinarily used upon automobiles and showing the manner of association therewith of my improved lubricator. Portions of the figure are broken away, to reduce its size.

Fig. 2 is an enlarged, transverse vertical sectional view taken upon the line 2—2 of Fig. 1, with the direction of view as indicated.

Fig. 3 is a plan view of the lubricator alone.

Fig. 4 is a more highly enlarged sectional view of the lubricator of Fig. 3, the plane of section is indicated by the line 4—4 of that figure, and the direction of view by the arrows.

Fig. 5 is a view similar to Fig. 3, showing a slightly modified form of lubricator.

Fig. 6 is an enlarged sectional view taken upon the line 6—6 of Fig. 5, with the direction of view as indicated.

Fig. 7 is a view similar to Figs. 3 and 5, but showing a still further modified form.

The present invention contemplates the insertion of one of my improved lubricators between each two adjacent leaves 11, 12 of a leaf spring 13, a portion of one of which is illustrated upon Fig. 1. The point at which the device should be inserted is closely adjacent the end of the shorter of the two associated leaves—in the case of the lubricator indicated at 14 upon Fig. 1, it is disposed closely adjacent the end of the leaf 12, immediately thereunder, inasmuch as the leaf 12 is shorter than the leaf 11. It is well known that the area of greatest relative movement between contiguous leaves of a leaf spring is at the area indicated, hence these are the portions of the spring which are most in need of constant lubrication.

That form of my invention which is illustrated upon Figs. 1 to 4 inclusive comprises a flat lubricating plate 16 of annular form having a plurality of holes 17 disposed in any convenient arrangement therein. These holes 17 provide convenient pockets for the reception of the lubricant which preferably is in paste form and may or may not contain a suitable proportion of colloidal graphite, depending upon the type of spring and the type of service to which it is to be subjected.

Attention is invited to the fact that the holes 17 extend completely through the plate 16; that is to say, they open at both faces of the plate so that the lubricant contained within the holes 17 can be distributed to the proximal faces of both the associated leaves 11 and 12. The two faces of the plate 16 are equally smooth, there being a two-fold purpose for this detail: first, to aid in the equal distribution of lubricant to both leaves as mentioned; and, second, to aid the tendency for the lubricating plate 16 to attach itself to either of the two adjacent leaves 11 and 12.

One of the principal objects of the present invention is so to construct and so to install the lubricator that the lubricating plate 16 moves with respect to both leaves during normal use of the spring, thus establishing a distinct difference from prior known devices of this character wherein particular effort has been made to cause the lubricating plate to attach itself to and remain stationary with respect to one of the two associated leaves. One of the disadvantages of construction of the conventional type referred to is that the distribution of the lubricant is not as even, nor is it as thorough, as is attained by the device of my invention; further there is a distinct tendency for the lubricant to harden within each of the holes of the conventional type of lubricating plate, after a sufficient quantity thereof has been released. Since the conventional type of plate remains stationary with respect to one of the leaves, that portion of the lubricant within each hole which is in contact with the leaf to which the plate is attached is not distributed and there therefore is no tendency for this relatively hard deposit of lubricant to be distributed and thus kept in a more nearly fluid state. In the case of the present invention, however, a certain degree of motion of the lubricating plate is permitted with respect to both of the adjacent leaves. Not only is the lubricant continuously fed to both leaves, but the lubricant remaining within the holes 17 is continually agitated at both faces of the plate or, to be more exact, at both ends of each hole 17, thus entirely eliminating the tendency for the lubricant to become hardened and thus not effective by its being continually subject to a certain degree of agitation.

It is important, however, to provide means for securing the lubricating plate 16 in operative position between the two adjacent leaves. In order to accomplish this and still not fasten the lubricating plate 16 in such manner that it cannot move, I have provided a second plate 15 which carries the anchoring means and which is so connected to the lubricating plate 16 that the desired degree of motion of the lubricating plate 16 with respect even to the leaf to which the anchoring plate 17 is attached is permitted at all times.

In the case of the embodiment at present under discussion, the anchoring plate 15 is in the form of an annulus disposed within a circular recess 18 at the center of the lubricating plate 16. The circular form of the recess 18 permits the lubricating plate 16 to rotate freely about the anchoring plate 15, the importance being that wear upon the lubricating plate is thus evenly distributed throughout the entire area of both of its faces and lubricant from all of the several holes 17 is also more evenly distributed to the contiguous areas of the associated spring leaves.

It should be observed that the anchoring plate 15 fits relatively loosely within the aperture 18. This is to permit the lubricating plate 16 to shift back and forth slightly with respect to the anchoring plate 15 when the two leaves 11 and 12 of the spring 13 move with respect to each other, as in normal operation of the spring. It is this slight movement of the lubricating plate 16, irrespective of any rotational movement about the anchoring plate, which is relied upon most to secure the advantages outlined hereinabove.

The anchoring plate 15 can be a solid disc or can be of annular form as illustrated. In the latter case I contemplate providing an additional lubricating plate 19 inside the anchoring plate 15, also free to rotate and to oscillate with respect to the anchoring plate 15 because of the circular form of the aperture 21 within which the inner lubricating plate 19 seats, and because of the relatively loose fit of the lubricating plate 19 within that aperture 21.

The anchoring means whereby the anchoring plate 15 is caused to attach itself to one of the leaves 11 or 12 preferably comprises some sort of projection upon one face of the plate 15 adapted to penetrate the surface of the adjacent leaf of the spring 13. This can most conveniently be provided by forming a slight burr upon either the inner or outer periphery of the anchoring plate 15. This burr may be continuous throughout that entire periphery, but in any event should project slightly beyond the associated face of the anchoring plate.

I prefer that the metal of which the anchoring plate 15 is formed be considerably harder than the metal of the leaves of the spring with which it is to be used, thus insuring that the burr 22 will penetrate the adjacent leaf and thus effectually anchor the entire bearing against inadvertent displacement by moving laterally out from between its two adjacent leaves.

Fig. 5 illustrates a modified form of lubricator wherein the lubricating plate 26 is in the form of a disc carrying a plurality of holes 27 within which the lubricant is stored. Encircling the lubricating plate 26 is an annular anchoring plate 28. The lubricating plate 26 seats loosely within the anchoring plate 28, so that it is free to revolve with respect thereto and also to oscillate slightly as the spring with which it is associated is in use.

A further modified form is illustrated upon Fig. 7, wherein the lubricating plate 31 is of any suitable form, the one illustrated being rectangular. This plate is also provided with a plurality of holes 32 for the reception of lubricant, and a relatively large aperture 33, preferably adjacent its center, within which an anchoring plate 34 is recessed. In this instance the aperture 33 and the lubricating plate 34 are non-circular. Accordingly, no rotation of the lubricator with respect to the anchoring plate can occur, although oscillation of the lubricating plate with respect to the anchoring plate can occur because the anchoring plate 34 fits relatively loosely within the aperture 33.

In the case of both anchoring plates 28 and 34 the preferable form of anchoring means is a peripheral burr similar to that of the modification illustrated upon Fig. 3.

I claim:

1. A leaf spring lubricator comprising a lubricating plate adapted to be inserted between contiguous leaves of a leaf spring and having holes therein for the reception of lubricant, said holes extending through said plate whereby said lubricant is distributed to both of the associated spring leaves, both surfaces of said lubricating plate being smooth whereby it is free to move with respect to both of said spring leaves, said plate also having a recess therein, an anchoring plate disposed within said recess, and means on said anchoring plate for attaching it to one of said spring leaves, said anchoring plate fitting loosely within said recess to permit a limited degree of movement of said lubricating plate with respect to the spring leaf to which said anchoring plate is fastened.

2. A leaf spring lubricator comprising a lubricating plate adapted to be inserted between contiguous leaves of a leaf spring and having holes therein for the reception of lubricant, said holes extending through said plate whereby said lubricant is distributed to both of the associated spring leaves, both surfaces of said lubricating plate being smooth whereby it is free to move with respect to both of said spring leaves, said plate also having a circular recess therein, an anchoring plate disposed within said recess, and means on said anchoring plate for attaching it to one of said spring leaves, said anchoring plate fitting sufficiently loosely within said recess to permit rotary movement of said lubricating plate with respect to said anchoring plate.

3. A leaf spring lubricator comprising a lubricating plate adapted to be inserted between contiguous leaves of a leaf spring and having holes therein for the reception of lubricant, both surfaces of said lubricating plate being smooth whereby it is free to move with respect to both of said spring leaves, said plate also having a circular recess therein, an anchoring plate disposed within said recess, and means on said anchoring plate for attaching it to one of said spring leaves, said anchoring plate fitting sufficiently loosely within said recess to permit rotary movement of said lubricating plate with respect to said anchoring plate.

4. A leaf spring lubricator comprising a lubricating plate adapted to be inserted between contiguous leaves of a leaf spring and having holes therein for the reception of lubricant, said holes extending through said plate whereby said lubricant is distributed to both of the associated spring leaves, both surfaces of said lubricating plate being smooth whereby it is free to move with respect to both of said spring leaves, said plate also having a recess therein, an anchoring plate disposed within said recess, and means on said anchoring plate for penetrating one of said spring leaves to retain the anchoring plate motionless with respect thereto, said anchoring plate fitting loosely within said recess to permit a limited degree of movement of said lubricating plate with respect to the spring leaf to which said anchoring plate is fastened.

5. A leaf spring lubricator comprising a lubricating plate adapted to be inserted between contiguous leaves of a leaf spring and having holes therein for the reception of lubricant, said holes extending through said plate whereby said lubricant is distributed to both of the associated spring leaves, both surfaces of said lubricating plate being smooth whereby it is free to move with respect to both of said spring leaves, said plate also having a recess therein, an anchoring plate disposed within said recess, and a peripheral barb formed on said anchoring plate and protruding beyond the plane of one of its faces to penetrate one of said spring leaves and retain the anchoring plate motionless with respect thereto, said anchoring plate fitting loosely within said recess to permit a limited degree of movement of said lubricating plate with respect to the spring leaf to which said anchoring plate is fastened.

6. A leaf spring lubricator comprising a lubricating plate adapted to be inserted between contiguous leaves of a leaf spring and having holes therein for the reception of lubricant, both surfaces of said lubricating plate being smooth whereby it is free to move with respect to both of said spring leaves, said plate also having a circular recess therein, an anchoring plate disposed within said recess, and means on said anchoring plate for penetrating one of said spring leaves to retain the anchoring plate motionless with respect thereto, said anchoring plate fitting sufficiently loosely within said recess to permit rotary movement of said lubricating plate with respect to said anchoring plate.

7. A leaf spring lubricator comprising a lubricating plate adapted to be inserted between contiguous leaves of a leaf spring and having holes therein for the reception of lubricant, both surfaces of said lubricating plate being smooth whereby it is free to move with respect to both of said spring leaves, said plate also having a circular recess therein, an anchoring plate disposed within said recess, said anchoring plate fitting sufficiently loosely within said recess to permit rotary movement of said lubricating plate with respect to said anchoring plate, and a peripheral barb formed on said anchoring plate and protruding beyond the plane of one of its faces to penetrate one of said spring leaves and retain the anchoring plate motionless with respect thereto.

HERBERT H. HASCHE.